(12) United States Patent
Kirk et al.

(10) Patent No.: US 9,098,908 B2
(45) Date of Patent: Aug. 4, 2015

(54) GENERATING A DEPTH MAP

(75) Inventors: Adam G. Kirk, Renton, WA (US);
Yaron Eshet, Seattle, WA (US);
Kestutis Patiejunas, Sammamish, WA (US); Sing Bing Kang, Redmond, WA (US); Charles Lawrence Zitnick, III, Seattle, WA (US); David Eraker, Seattle, WA (US); Simon Winder, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 13/278,184

(22) Filed: Oct. 21, 2011

(65) Prior Publication Data

US 2013/0100256 A1 Apr. 25, 2013

(51) Int. Cl.
*G06T 7/00* (2006.01)

(52) U.S. Cl.
CPC ............ *G06T 7/0057* (2013.01); *G06T 7/0075* (2013.01); *G06T 2207/10048* (2013.01)

(58) Field of Classification Search
USPC ................. 348/42–60; 382/100, 104, 154
See application file for complete search history.

(56) References Cited

U.S. PATENT DOCUMENTS

| | | | |
|---|---|---|---|
| 5,045,937 A * | 9/1991 | Myrick ........................ | 348/144 |
| 5,852,672 A | 12/1998 | Lu et al. | |
| 7,103,212 B2 | 9/2006 | Hager et al. | |
| 7,660,458 B1 * | 2/2010 | Saric ........................... | 382/154 |
| 8,121,352 B2 | 2/2012 | Arias-Estrada et al. | |
| 8,284,240 B2 | 10/2012 | Saint-Pierre et al. | |
| 2004/0179728 A1 | 9/2004 | Littlefield et al. | |
| 2004/0197016 A1 | 10/2004 | Littlefield et al. | |
| 2004/0258279 A1 * | 12/2004 | Hirvonen et al. ............. | 382/104 |
| 2006/0210146 A1 * | 9/2006 | Gu ................ | 382/154 |
| 2007/0009150 A1 * | 1/2007 | Suwa et al. ................... | 382/154 |
| 2008/0199071 A1 | 8/2008 | Gu | |
| 2010/0079481 A1 * | 4/2010 | Zhang et al. .................. | 345/595 |
| 2010/0265316 A1 * | 10/2010 | Sali et al. ........................ | 348/46 |
| 2010/0328475 A1 | 12/2010 | Thomas et al. | |
| 2011/0025827 A1 * | 2/2011 | Shpunt et al. ................... | 348/47 |

(Continued)

FOREIGN PATENT DOCUMENTS

| | | |
|---|---|---|
| CN | 101604112 A | 12/2009 |
| CN | 101701828 A | 5/2010 |

(Continued)

OTHER PUBLICATIONS

Genlock. (n.d.) In Wikepedia. Retrieved on Aug. 8, 2014 from https://web.arch ive.org/web/20051215000000/http://en.wikipedia.org/wiki/Genlock.*

(Continued)

*Primary Examiner* — Dave Czekaj
*Assistant Examiner* — Shanika Brumfield
(74) *Attorney, Agent, or Firm* — Steve Wight; Judy Yee; Micky Minhas (57) ABSTRACT

Methods and systems for generating a depth map are provided. The method includes projecting an infrared (IR) dot pattern onto a scene. The method also includes capturing stereo images from each of two or more synchronized IR cameras, detecting a number of dots within the stereo images, computing a number of feature descriptors for the dots in the stereo images, and computing a disparity map between the stereo images. The method further includes generating a depth map for the scene using the disparity map.

20 Claims, 7 Drawing Sheets

(56) References Cited

U.S. PATENT DOCUMENTS

| | | | |
|---|---|---|---|
| 2011/0080464 A1 | 4/2011 | Alessandrini et al. | |
| 2011/0158528 A1 | 6/2011 | Yea et al. | |
| 2011/0316982 A1* | 12/2011 | Steurer | 348/49 |
| 2012/0206573 A1 | 8/2012 | Dokor et al. | |
| 2013/0129193 A1 | 5/2013 | Wang | |
| 2013/0136299 A1 | 5/2013 | Kim et al. | |
| 2013/0182945 A1 | 7/2013 | Kim et al. | |
| 2014/0015923 A1 | 1/2014 | Au et al. | |
| 2014/0192158 A1 | 7/2014 | Whyte et al. | |
| 2014/0270485 A1 | 9/2014 | Kauff et al. | |

FOREIGN PATENT DOCUMENTS

| | | | |
|---|---|---|---|
| EP | 0915433 A2 | 5/1999 | |
| JP | 2005284775 A * | 10/2005 | G06T 1/00 |
| KR | 10-2011-0084029 A | 7/2011 | |
| WO | 98/47061 A2 | 10/1998 | |
| WO | 2012/073057 A2 | 6/2012 | |

OTHER PUBLICATIONS

Ypsilos, I. A., "Capture and Modelling of 3D Face Dynamics", Retrieved at <<http://www.ee.surrey.ac.uk/CVSSP/VMRG/Publications/ypsilos04phd.pdf>>, Sep. 2004, pp. 212.

Solony, Marek, "Scene Reconstruction from Kinect Motion", Retrieved at http://www.feec.vutbr.cz/EEICT/2011/sbornik/03-Doktorske%20projekty/09-Grafika%20a%20multimedia/06-xsolon00.pdf, 2011, pp. 5.

Kolar, et al., "Smart Bi-Spectral Image Sensor for 3D Vision", Retrieved at <<http://ieeexplore.ieee.org/stamp/stamp.jsp?tp=&arnumber=4388464>>, IEEE Sensors Conference, Oct. 28-31, 2007, pp. 577-580.

"CineWave Genlock", Retrieved at http://cdn.pinnaclesys.com/SupportFiles/CineWave_Genlock Guide.pdf>>, Dec. 1, 2010, pp. 1-9.

"International Search Report", Mailed Date: Apr. 29, 2013, Application No. PCT/US2012/061233, Filed Date: Oct. 21, 2012, pp. 9.

Kanade, et al., "Virtualized Reality Perspectives on 4D Digitization of Dynamic events", In IEEE Computer Graphics and Applications, May 30, 2007, pp. 32-40.

"First Office Action and Search Report," from Chinese Patent Application No. 201210401131.1, Mailed Date: Nov. 4, 2014, 17 Pages.

Fua, Pascal, "A Parallel Stereo Algorithm that Produces Dense Depth Maps and Preserves Image Features", In Journal of Machine Vision and Applications, vol. 6, Issue 1, Dec. 1, 1993, pp. 35-49.

"International Search Report & Written Opinion for PCT Patent Application No. PCT/US2014/017009", Mailed Date: Jun. 4, 2014, Filed Date: Feb. 10, 2014, 10 pages.

Bleyer, Michael et al., "Object stereo—joint stereo matching and object segmentation." Computer Vision and Pattern Recognition (CVPR), 2011 IEEE Conference on. IEEE, 2011, 8 pages.

Richardt, Christian et al., "Real-time spatiotemporal stereo matching using the dual-cross-bilateral grid." Computer Vision—ECCV 2010, Springer Berlin Heidelberg, 2010, pp. 510-523.

Hosni, Asmaa et al., "Temporally consistent disparity and optical flow via efficient spatio-temporal filtering." Advances in Image and Video Technology. Springer Berlin Heidelberg, 2012. pp. 165-177.

Fernandez et al., "Active Stereo-matching for One-shot Dense Reconstruction", In International Conference on Pattern Recognition Applications and Methods, Feb. 2012, 5 pages.

Saski et al., "Stereo Matching Algorithm using a Weighted Average of Costs Aggregated by Various Window Sizes", In Proceedings of the 7th Asian Conference on Computer Vision (ACCV)—vol. Part II, Jan. 13, 2006, 10 pages.

Denker et al., "Accurate Real-Time Multi-Camera Stereo-Matching on the GPU for 3D Reconstruction", In Journal of WSCG, vol. 19, No. 1, Jan. 24, 2013, 8 pages.

Newcombe et al., "KinectFusion: Real-Time Dense Surface Mapping and Tracking", In Proceedings of the 10th IEEE International Symposium on Mixed and Augmented Reality, Oct. 26, 2011, 10 pages.

Henry et al., "RGB-D mapping: Using Kinect-style Depth Cameras for Dense 3D Modeling of Indoor Environments" In International Journal of Robotic Research, vol. 31, No. 5, Feb. 10, 2012, 17 pages.

Davis et al., "Spacetime Stereo: A Unifying Framework for Depth from Triangulation", In IEEE Transactions on Pattern Analysis and Machine Intelligence, vol. 27, No. 2, Feb. 10, 2005, 7 pages.

Barnes et al., "PatchMatch: A Randomized Correspondence Algorithm for Structural Image Editing", In Proceedings of ACM Transactions of Graphics, Aug. 4, 2009, 10 pages.

Bleyer et al., "PatchMatch Stereo—Stereo Matching with Slanted Support Window", In Proceedings of the British Machine Vision Conference, Sep. 2011, 11 pages.

Hirschm Uller, Heiko, "Accurate and Efficient Stereo Processing by Semi-global Matching and Mutual Information", In Proceedings of IEEE Computer Society Conference on Computer Vision and Pattern Recognition, vol. 2, Jun. 20, 2005, 8 pages.

Min et al., "A Revisit to Cost Aggregation in Stereo Matching: How Far Can We Reduce Its Computational Redundancy?", In Proceedings of IEEE International Conference on Computer Vision, Nov. 6, 2011, 8 pages.

Yoon, Kuk-Jin, "Locally Adaptive Support-Weight Approach for Visual Correspondence Search", In Proceedings of IEEE Computer Society Conference on Computer Vision and Pattern Recognition, Jun. 20, 2005, 8 pages.

International Preliminary Report on Patentability, From PCT/US2012/061233, Mailed Apr. 29, 2013, 5 Pages.

Respose to First Office Action Filed Mar. 19, 2015, From Chinese Patent Application No. 201210401131.1, 7 Pages.

Voluntary Amendment Filed Apr. 15, 2014 to European Patent Application No. 128416690. 33 Pages.

Non-Final Office Action Mailed Oct. 1, 2014 From U.S. Appl. No. 13/375,179. 14 Pages.

Response to Non-Final Office Action Filed Jan. 2, 2015 From U.S. Appl. No. 13/775,179. 16 Pages.

Final Office Action Mailed Jan. 15, 2015 From U.S. Appl. No. 13/775,179. 19 Pages.

International Search Report and Written Opinion Mailed Jun. 4, 2014 From PCT Application No. PCT/US2014/017009. 11 Pages.

Demand and Response to the International Search Report Filed Jul. 25, 2014 From PCT Application No. PCT/US2014/017009. 17 Pages.

Written Opinion Mailed Feb. 2, 2015 From International Application No. PCT/US2014/017009. 27 Pages.

"Second Office Action and Search Report," Mailed Apr. 15, 2015, From Chinese Patent Application No. 201210401131.1, 15 pages.

* cited by examiner

GENERATING A DEPTH MAP

BACKGROUND

Stereo vision is the extraction of three-dimensional information from images by comparing information about a scene from two different viewpoints. Stereo vision is one of the most heavily researched areas in computer vision technology. Traditional stereo algorithms are used to generate depth maps from color, or RGB, images. However, these algorithms are limited in their effectiveness by both the quantity of relevant features in the scene as well as assumptions such as the constancy of brightness within the scene. In some cases, it may be difficult to generate a depth map of elements within a scene from solid color objects, such as a shirt that has no pattern or a single-colored wall. Moreover, lighting variations are commonly found in non-studio conditions, such as within living rooms.

In addition, technologies for active depth sensing have improved depth estimation approaches though the use of structured light to extract geometry from a scene. With existing technology, such as found in the Kinect™ system from Microsoft® Corporation, a structured infrared (IR) pattern is projected onto the scene and photographed by a single IR camera. Based on deformations of the light pattern, geometric information about the underlying video scene can be determined and used to generate a depth map. However, despite the advantages of structured light technology, the modules generate interference between the projected patterns when they are used to sample the same scene at the same time. In addition, when multiple modules attempt to sample the same scene at the same time, there may be significant problems associated with the temporal synchronization of various depth maps. Moreover, it may also be difficult to calibrate the structured light projectors or lasers correctly.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for generating a depth map. The method includes using a particular form of structured light, namely, projecting an infrared (IR) dot pattern onto a scene. The method also includes capturing stereo images from each of two or more synchronized IR cameras. To compute a disparity map between images, the method detects a number of dots within the stereo images and computes a number of feature descriptors for the dots in the stereo images. In embodiments, the disparity map may include disparity values for all of the matched dots within the stereo images. The method further includes generating a full or partial depth map for the scene using the disparity map. Herein, each module will be referred to as an active IR stereo module.

Another embodiment provides a stereo module system for generating a depth map. The stereo module system includes a processor configured to handle the processing for multiple active IR stereo modules. Each active IR stereo module include an IR pattern projection module configured to project an IR dot pattern onto a scene and a synchronized camera module configured to capture stereo images from each of two or more temporally-synchronized IR cameras. Each active IR stereo module also include a dot detection module configured to identify a number of dots within the stereo images, a feature description module configured to compute a number of feature descriptors for the dots in the stereo images, and a disparity computation module configured to compute a disparity map between the stereo images. In addition, each active IR stereo module includes a depth map generation module configured to generate a depth map for the scene using the disparity map.

Further, another embodiment provides one or more non-volatile computer-readable storage media for storing computer readable instructions. When executed by one or more processing modules, the computer-readable instructions provide a stereo module system for the generation of a depth map. The computer-readable instructions include code configured to project an IR dot pattern onto a scene and capture stereo images from two or more synchronized IR cameras. The computer-readable instructions also include code configured to detect a number of dots within the stereo images, compute a number of feature descriptors for the dots in the stereo images, compute a disparity map between the stereo images, and generate a depth map for the scene using the disparity map.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

As discussed above, traditional stereo algorithms are limited in their effectiveness by both the quantity of relevant features in the scene as well as assumptions such as the constancy of brightness within the scene. Therefore, embodiments described herein are designed to generate a more accurate depth map for scenes where there is not a brightness constancy assumption. For example, brightness constancy assumptions are not accurate for scenes where there is often inconsistent lighting, such as living rooms, as well as in low-feature areas where traditional stereo algorithms fail.

Embodiments disclosed herein set forth a method and system for generating a depth map for a scene using an active IR stereo module. As used herein, an "active IR stereo module" refers to a type of imaging module which utilizes stereopsis to generate a three-dimensional depth map of a scene. Stereopsis is the process of creating a three-dimensional (or "stereo") view (or "opsis") of a scene from two or more different perspectives. The three-dimensional view of the scene may be acquired by generating a depth map using a method for disparity detection between the stereo images from the different perspectives.

Similarly, the term "stereo vision" refers to the recovery of the third dimension of an image by determining the depth of the image through the use of two or more stereo images taken from known viewpoints. The depth of the stereo images may be determined based on the points within the stereo images that match, or correspond. Once the corresponding points within the stereo images have been identified, triangulation of the cameras may be performed to recover the stereo image depths. Triangulation is the process of determining the locations of a point in three-dimensional space based on the projection of the point onto two or more stereo images. The term "active stereo vision" refers to depth recovery with the aid of structured light projected onto the scene.

The term "depth map" is commonly used in three-dimensional computer graphics applications to describe an image that contains information relating to the distance from a camera viewpoint to a surface of an object in a scene. Stereo vision uses image features, which may include brightness, to estimate stereo disparity. The disparity map may be converted to a depth map using the intrinsic and extrinsic camera configuration. According to the current method, one or more active IR stereo modules may be utilized to create a three-dimensional depth map for a scene.

In an embodiment, an active IR stereo module may consist of a structured light projector that projects a random infrared (IR) dot pattern, one or more RGB cameras, and two or more synchronized (for example, genlocked) stereo IR cameras. The active IR stereo module may be utilized to project a random IR dot pattern onto a scene using an IR dot pattern projector and to capture stereo images of the scene using two or more genlocked IR cameras. The term "genlocking" is commonly used to describe a technique for maintaining temporal coherence between two or more signals, i.e., synchronization between the signals.

Dots may be detected within the stereo images, and a number of feature descriptors may be computed for the dots. Feature descriptors may provide a starting point for the comparison of the stereo images from two or more genlocked cameras and may include points of interest within the stereo images. For example, specific dots within one stereo image may be analyzed and compared to corresponding dots within another temporally-coherent stereo image.

A disparity map may be computed between two or more stereo images using traditional stereo techniques, and the disparity map may be utilized to generate a depth map for the scene. As used herein, a "disparity map" refers to a distribution of pixel shifts across two or more stereo images. A disparity map may be used to measure pixel shifts between stereo images captured from two or more different, corresponding viewpoints. In addition, simple algorithms may be used to convert a disparity map into a depth map.

It should be noted that the current method is not limited to the use of an IR dot pattern projector or IR cameras. Rather, any type of pattern projector which projects recognizable feature, such as dots, triangles, grids, or the like, may be used. In addition, any type of camera which is capable of detecting the presence of projected features onto a scene may be used.

An embodiment provides a system of multiple active IR stereo modules connected by a synchronization signal. The system may include any number of active IR stereo modules, each including two or more genlocked cameras. The system of multiple active IR stereo modules may be utilized to generate depth maps for a scene from different positions, or perspectives.

The system of multiple active IR stereo modules may be genlocked using a synchronization signal between the active IR stereo modules. A synchronization signal may be any signal which results in the temporal coherence of the active IR stereo modules. In this embodiment, temporal coherence of the active IR stereo modules ensures that all of the active IR stereo modules are operating at the same instant of time, so that the stereo images from the active IR stereo modules will directly relate to each other.

Once all of the active IR stereo modules have confirmed the receipt of the synchronization signal, each active IR stereo module may generate a depth map according to the method described above with respect to the single stereo module system. A constructive view of a scene may be created from a combination of depth maps from the multiple active IR stereo modules. This constructive view may provide an accurate, three-dimensional view of the scene.

In an embodiment, the above system of multiple active IR stereo modules utilizes an algorithm that is based on structured light in the form of a random IR dot pattern, which is projected onto a scene and recorded with two or more genlocked stereo IR cameras to generate a depth map. As additional active IR stereo modules are used to record the same scene, multiple random IR dot patterns are viewed constructively from the IR cameras in each active IR stereo module. This is possible because multiple active IR stereo modules do not experience interference as more active IR stereo modules are added to the recording array.

The problem of interference between the active IR stereo modules is eliminated due to the nature of the random IR dot patterns. Each active IR stereo module is not attempting to match a random IR dot pattern, detected by a camera, to a specific pattern, projected onto a scene. Instead, each module is observing the current dot pattern as a random pattern projected onto the scene. Thus, while the current dot pattern that is being projected onto the scene may be a combination of random IR dot patterns from multiple random IR dot pattern projectors, the actual pattern of the dots is irrelevant, since the dot pattern is not being compared to any standard dot pattern. Therefore, this allows for the use of multiple active IR stereo modules for imaging the same scene without the occurrence of interference. Interference may only occur when the number of active IR stereo modules becomes so large that the density of dots is too high, and many dots begin overlapping.

As previously noted for the case of a single stereo module system, the aforementioned embodiment is also not limited to the use of a random IR dot pattern projector or IR cameras. Rather, any type of pattern projector which projects recognizable feature, such as dots, triangles, grids, or the like, may be used. In addition, any type of camera which is capable of detecting the presence of projected features onto a scene may be used.

Figure 1:
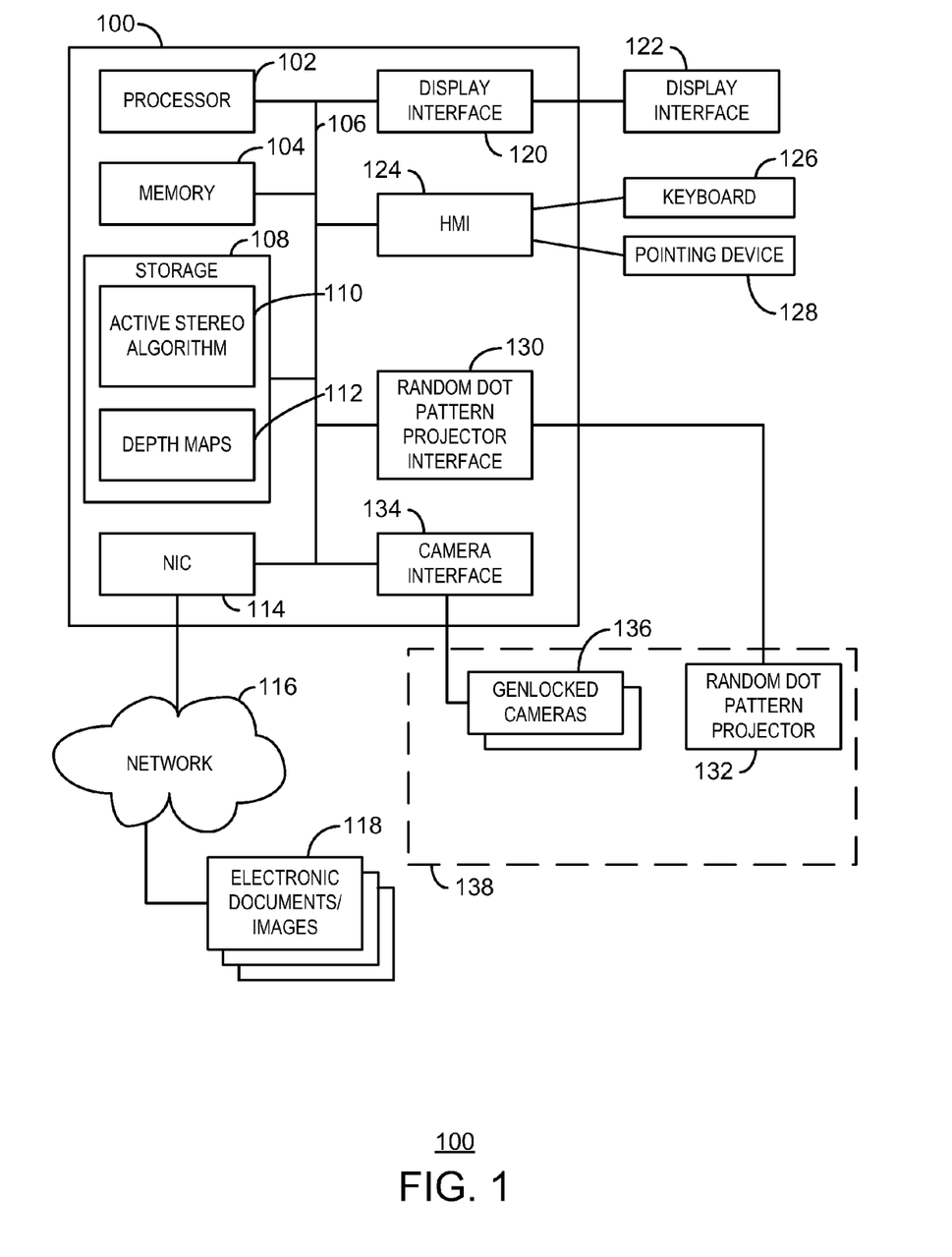
FIG. 1 is a block diagram of a stereo module system that may be used for the generation of a depth map for a scene.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

FIG. 1 is a block diagram of a stereo module system 100 that may be used for the generation of a depth map for a scene. The stereo module system 100 may include a processor 102 that is adapted to execute stored instructions, as well as a memory device 104 that stores instructions that are executable by the processor. The processor 102 can be a single core processor, a multi-core processor, a computing cluster, or any number of other configurations. The memory device 104 can include random access memory (RAM), read only memory (ROM), flash memory, or any other suitable memory systems. These instructions implement a method that includes projecting a random IR dot pattern onto a scene, capturing stereo images from each of two or more genlocked cameras, detecting a number of dots within the stereo images, computing a number of feature descriptors for the number of dots in the stereo images, computing a disparity map between the stereo images, and generating a depth map for the scene using the disparity map. The processor 102 is connected through a bus 106 to one or more input and output devices.

The stereo module system 100 may also include a storage device 108 adapted to store an active stereo algorithm 110 and the depth maps 112 generated by the system 100. The storage device 108 can include a hard drive, an optical drive, a thumbdrive, an array of drives, or any combinations thereof. A network interface controller 114 may be adapted to connect the stereo module system 100 through the bus 106 to a network 116. Through the network 116, electronic text and imaging input documents 118 may be downloaded and stored within the computer's storage system 108. In addition, the stereo module system 100 may transfer depth maps or RGB images over the network 116.

The stereo module system 100 may be linked through the bus 106 to a display interface 120 adapted to connect the system 100 to a display device 122, wherein the display device 122 may include a stereoscopic 3D display, computer monitor, camera, television, projector, virtual reality display, or mobile device, among others. A human machine interface 124 within the stereo module system 100 may connect the system to a keyboard 126 and pointing device 128, wherein the pointing device 128 may include a mouse, trackball, touchpad, joy stick, pointing stick, stylus, or touchscreen, among others. It should also be noted that the stereo module system 100 may include any number of other components, including a printing interface adapted to connect the stereo module system 100 to a printing device or a gaming interface adapted to connect the stereo module system 100 to a gaming device, among others.

The stereo module system 100 may also be linked through the bus 106 to a random dot pattern projector interface 130 adapted to connect the stereo module system 100 to a random dot pattern projector 132. In addition, a camera interface 134 may be adapted to connect the stereo module system 100 to three or more genlocked cameras 136, wherein the three or more genlocked cameras may include at least two IR cameras and at least one RGB camera. In an embodiment, the stereo module system 100 may be connected to any number of additional IR cameras or RGB cameras, depending on the specific application, The random dot pattern projector 132 and three or more genlocked cameras 136 may be included within an active IR stereo module 138. In an embodiment, the stereo module system 100 may be connected to multiple active IR stereo modules 138 at one time. In another embodiment, each stereo module may be connected to a separate stereo module system 100. In other words, any number of stereo module systems 100 may be connected to any number of active IR stereo modules 138. In an embodiment, each active IR stereo module 138 may include local storage on the module, such that each active IR stereo module may store an independent view of the scene locally. Further, in another embodiment, the entire system 100 may be included within the active IR stereo module 138. Any number of additional active IR stereo modules may also be connected to the active IR stereo module 138 through the network 116.

Figure 2:
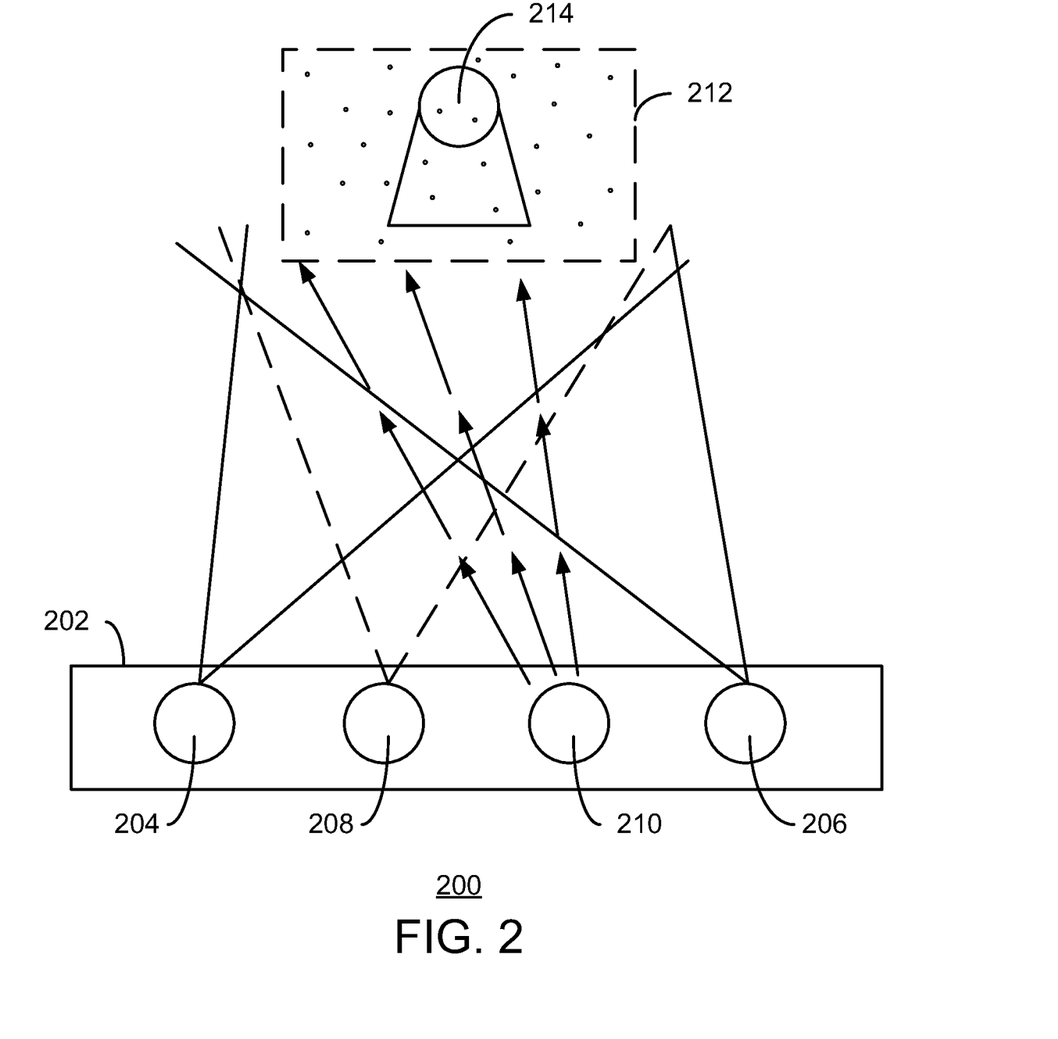
FIG. 2 is a schematic of an active IR stereo module that may be used for the generation of a depth map for a scene.

FIG. 2 is a schematic 200 of an active IR stereo module 202 that may be used for the generation of a depth map for a scene. As noted, an active IR stereo module 202 may include two IR cameras 204 and 206, an RGB camera 208, and a random IR dot pattern projector 210. The IR cameras 204 and 206 and RGB camera 208 may be genlocked, or synchronized. The genlocking of the IR cameras 204 and 206 and RGB camera 208 ensures that the cameras are temporally coherent, so that the captured stereo images directly correlate to each other. Further, any number of IR cameras may be added to the active IR stereo module 202 in addition to the two IR cameras 204 and 206. Also, active IR stereo module 202 is not limited to the use of IR cameras, since many other types of cameras may be utilized within the active IR stereo module 202. In addition, any number of additional RGB cameras may be used in addition to the RGB camera 208.

The RGB camera 208 may be utilized to capture a color image for the scene by acquiring three different color signals, i.e., red, green, and blue. Any number of additional RGB cameras may be added to the active IR stereo module 202 in addition to the one RGB camera 208. The output of the RGB camera 208 may provide a useful supplement to a depth map for many applications, such as Free Viewpoint Video (FVV), telepresence, or medical imaging applications.

The random IR dot pattern projector 210 may be used to project a random IR dot pattern 212 onto a scene 214. In addition, the random IR dot pattern projector 210 may be replaced with any other type of projector with a different pattern.

The two genlocked IR cameras 204 and 206 may be used to capture images of the scene, including the random pattern 212 of IR dots. The images from the two IR cameras 204 and 206 may be analyzed according to the method described below in FIG. 3 to generate a depth map for the scene.

Figure 3:
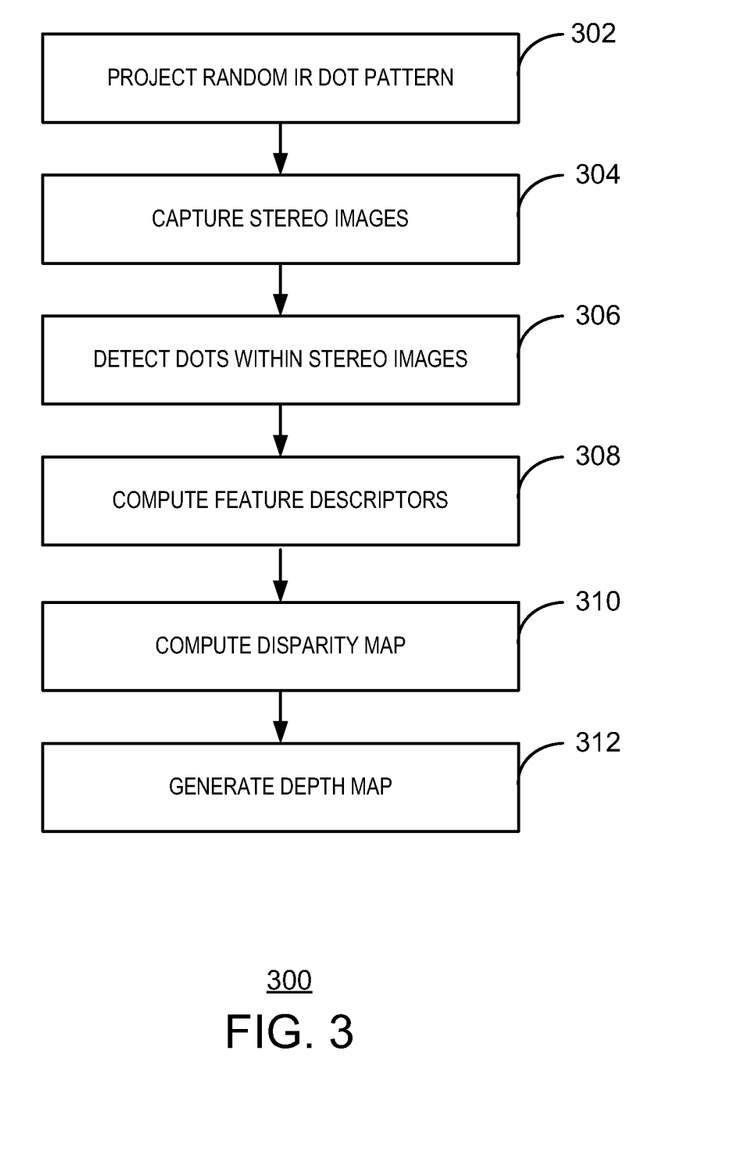
FIG. 3 is a process flow diagram showing a method for the generation of a depth map using an active IR stereo module.

FIG. 3 is a process flow diagram showing a method 300 for the generation of a depth map using an active IR stereo module. At block 302, a random IR dot pattern is projected onto a scene. The random IR dot pattern may be an IR laser dot pattern generated by a projector within an active IR stereo module. The random IR dot pattern may also be any other type of pattern, projected by any module in the vicinity of the scene.

At block 304, stereo images may be captured from two or more stereo cameras within an active IR stereo module. The stereo cameras may be IR cameras, as discussed above, and may be genlocked to ensure that the stereo cameras are temporally coherent. The stereo images captured at block 304 may include the projected random IR dot pattern from block 302.

At block 306, dots may be detected within the stereo images. The detection of the dots may be performed within the stereo module system 100. Specifically, the stereo images may be processed by a dot detector within the stereo module system 100 to identify individual dots within the stereo images. The dot detector may also attain sub-pixel accuracy by processing the dot centers.

At block 308, feature descriptors may be computed for the dots detected within the stereo images. The feature descriptors may be computed using a number of different approaches, including several different binning approaches, as described below with respect to FIGS. 4 and 5. The feature descriptors may be used to match similar features between the stereo images.

At block 310, a disparity map may be computed between the stereo images. The disparity map may be computed using traditional stereo techniques, such as the active stereo algorithm discussed with respect to FIG. 1. The feature descriptors may also be used to create the disparity map, which may map the similarities between the stereo images according to the identification of corresponding dots within the stereo images.

At block 312, a depth map may be generated using the disparity map from block 310. The depth map may also be computed using traditional stereo techniques, such as the active stereo algorithm discussed with respect to FIG. 1. The depth map may represent a three-dimensional view of a scene. It should be noted that this flow diagram is not intended to indicate that the steps of the method should be executed in any particular order.

Figure 4:
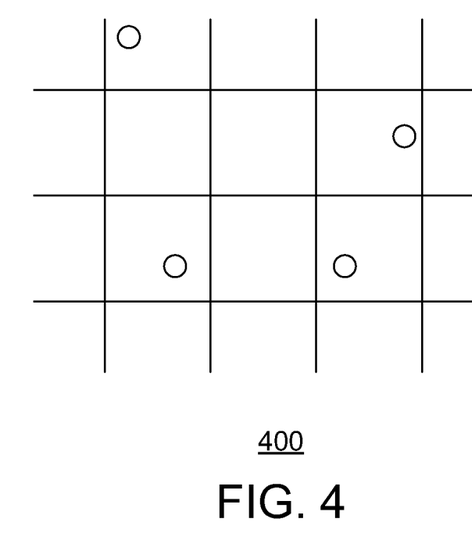
FIG. 4 is a schematic of a type of binning approach that may be used to identify feature descriptors within stereo images.

FIG. 4 is a schematic of a type of a binning approach 400 that may be used to identify feature descriptors within stereo images. The binning approach 400 utilizes a two-dimensional grid that is applied to a stereo image. The dots within the stereo image may be assigned to specific coordinate locations within a given bin. This may allow for the identification of feature descriptors for individual dots based on the coordinates of neighboring dots.

Figure 5:
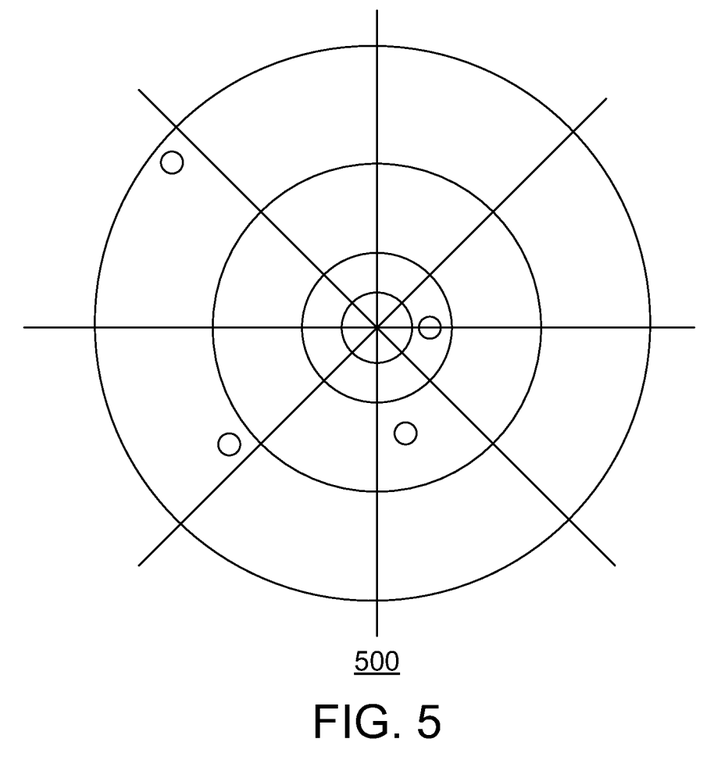
FIG. 5 is a schematic of another type of binning approach that may be used to identify feature descriptors within stereo images.

FIG. 5 is a schematic of another type of binning approach 500 that may be used to identify feature descriptors within stereo images. This binning approach 500 utilizes concentric circles and grids, e.g., a polar coordinate system, which forms another two-dimensional bin framework. A center point is selected for the grids, and each bin may be located by its angle for a selected axis, and its distance from the center point. Within a bin, the dots may be characterized by their spatial location, intensity, or radial location. For spatial localization, bins may be characterized by hard counts for inside dots if there is no ambiguity, or by soft counts for dots which may overlap between bins. For intensity modulation, the aggregate luminance of all dots within a specific bin may be assessed, or an intensity histogram may be computed. In addition, within a specific bin, a radial descriptor may be determined for each dot based on the distance and reference angle between a specific dot and a neighboring dot.

While FIG. 4 and FIG. 5 illustrate two types of binning approaches that may be used to identify feature descriptors in the stereo images, it should be noted that any other type of binning approach may be used. In addition, other approaches for identifying feature descriptors, which are not related to binning, may also be used.

Figure 6:
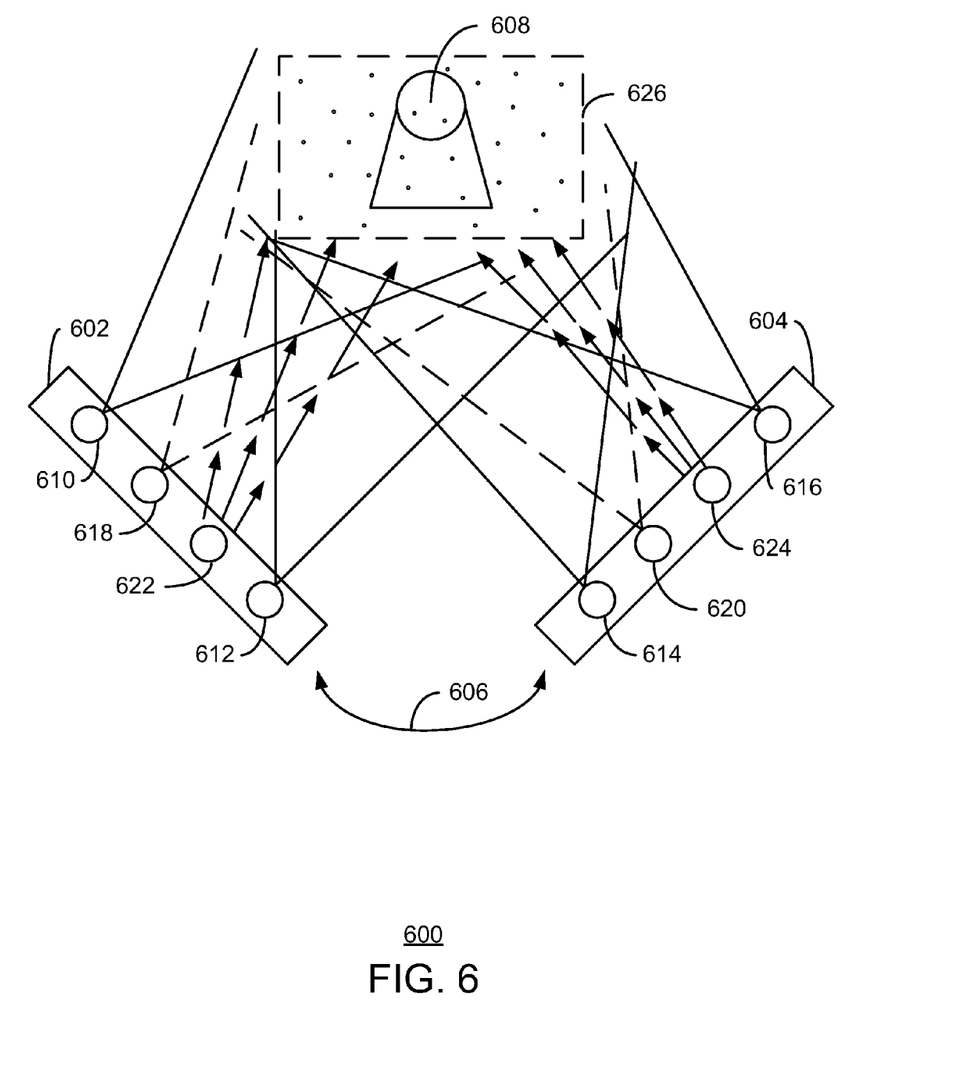
FIG. 6 is a schematic of a system of active IR stereo modules connected by a synchronization signal that may be used for the generation of depth maps for a scene.

FIG. 6 is a schematic of a system 600 of active IR stereo modules 602 and 604 connected by a synchronization signal 606 that may be used for the generation of depth maps for a scene 608. It should be noted that any number of active IR stereo modules may be employed by the system, in addition to the two active IR stereo modules 602 and 604. Further, each of the active IR stereo modules 602 and 604 may consist of two or more stereo cameras 610, 612, 614, and 616, one or more RGB cameras 618 and 620, and a random IR dot pattern projector 622 and 624, as discussed above with respect to FIG. 2.

Each of the random IR dot pattern projectors 622 and 624 for the active IR stereo modules 602 and 604 may be used to project a random IR dot pattern 626 onto the scene 608. It should be noted, however, that not every active IR stereo module 602 and 604 must include a random IR dot pattern projector 622 and 624. Any number of random IR dot patterns may be projected onto the scene from any number of active IR stereo modules or from any number of separate projection modules that are independent from the active IR stereo modules.

The synchronization signal 606 between the active IR stereo modules 602 and 604 may be used to genlock the active IR stereo modules 602 and 604, so that they are operating at the same instant of time. A depth map may be generated for each of the active IR stereo modules 602 and 604, according the abovementioned method from FIG. 3. The depth maps for the active IR stereo modules may be combined to generate a constructive view of the scene 608 from multiple points of view, as discussed below with respect to FIG. 7.

Figure 7:
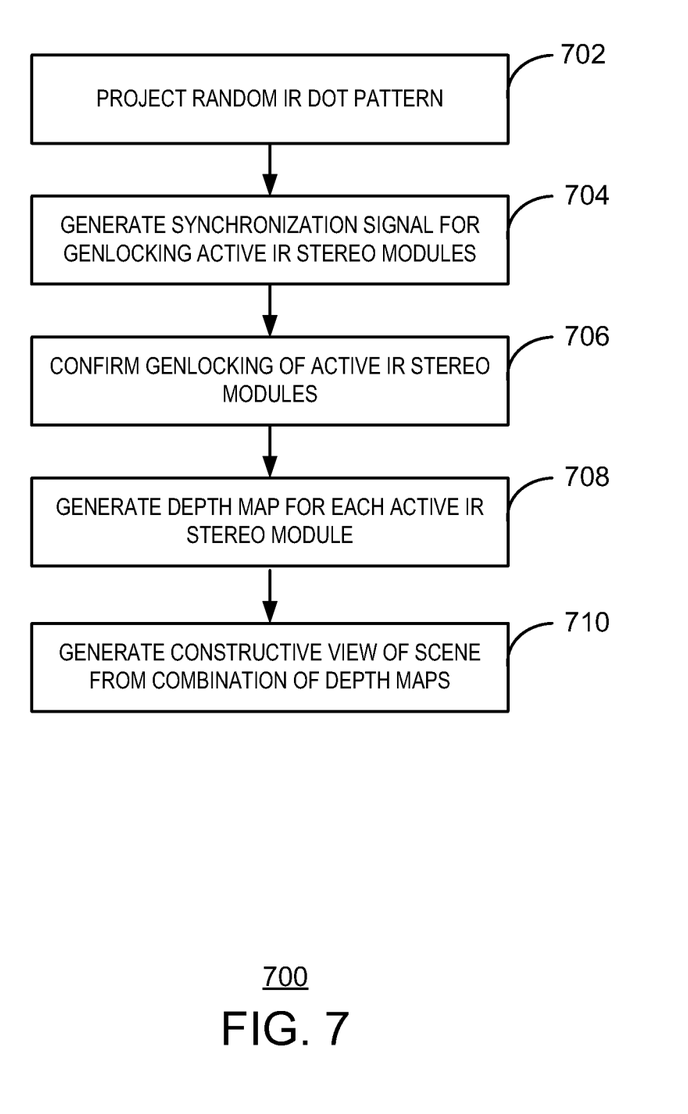
FIG. 7 is a process flow diagram showing a method for the generation of a constructive view of a scene from a combination of depth maps from multiple active IR stereo modules.

FIG. 7 is a process flow diagram showing a method 700 for the generation of a constructive view of a scene from a combination of depth maps from multiple active IR stereo modules. At block 702, a random IR dot pattern is projected onto a scene. The random IR dot pattern may be an IR laser dot pattern generated by a projector within an active IR stereo module. The random IR dot pattern may also be any other type of dot pattern, projected by any module in the vicinity of the scene. In addition, any number of the active IR stereo modules within the system may project a random IR dot pattern at the same time. Because of the random nature of the dot patterns, the overlapping of multiple dot patterns onto a scene will not cause interference problems, as discussed above.

At block 704, a synchronization signal may be generated. The synchronization signal may be used for the genlocking of multiple active IR stereo modules. This ensures the temporal coherence of the active IR stereo modules. In addition, the synchronization signal may be generated by one central module and sent to each active IR stereo module, generated by one active IR stereo module and sent to all other active IR stereo modules, generated by each active IR stereo module and sent to every other active IR stereo module, and so on. It should also be noted that either a software or a hardware genlock may be used to maintain temporal coherence between the active IR stereo modules. At block 706, the genlocking of the active IR stereo modules may be confirmed by establishing the receipt of the synchronization signal by each active IR stereo module.

At block 708, a depth map for the scene may be generated by each active IR stereo module, according to the method described with respect to FIG. 3. At block 710, a constructive view of the scene may be generated by forming a combination of depth maps from the active IR stereo modules. This constructive view may provide a representation of a scene from multiple perspectives, or multiple active IR stereo module systems, recorded at the same instant of time. In an embodiment, this method 700 may be used to generate an accurate representation of moving objects in three-dimensional space. Further, in an embodiment, the current system and method may be used to generate a constructive view of a scene in real-time, while, in another embodiment, a constructive view of the scene may be generated asynchronously after the active IR stereo modules have recorded a scene. It should be noted that this flow diagram is not intended to indicate that the steps of the method should be executed in any particular order or that all of the steps must be included in every case. For example, step 706 may be deleted in cases where a specific configuration of active IR stereo modules has already confirmed receipt of the synchronization signal previously, since the relationship between the active IR stereo modules has already been established.

Figure 8:
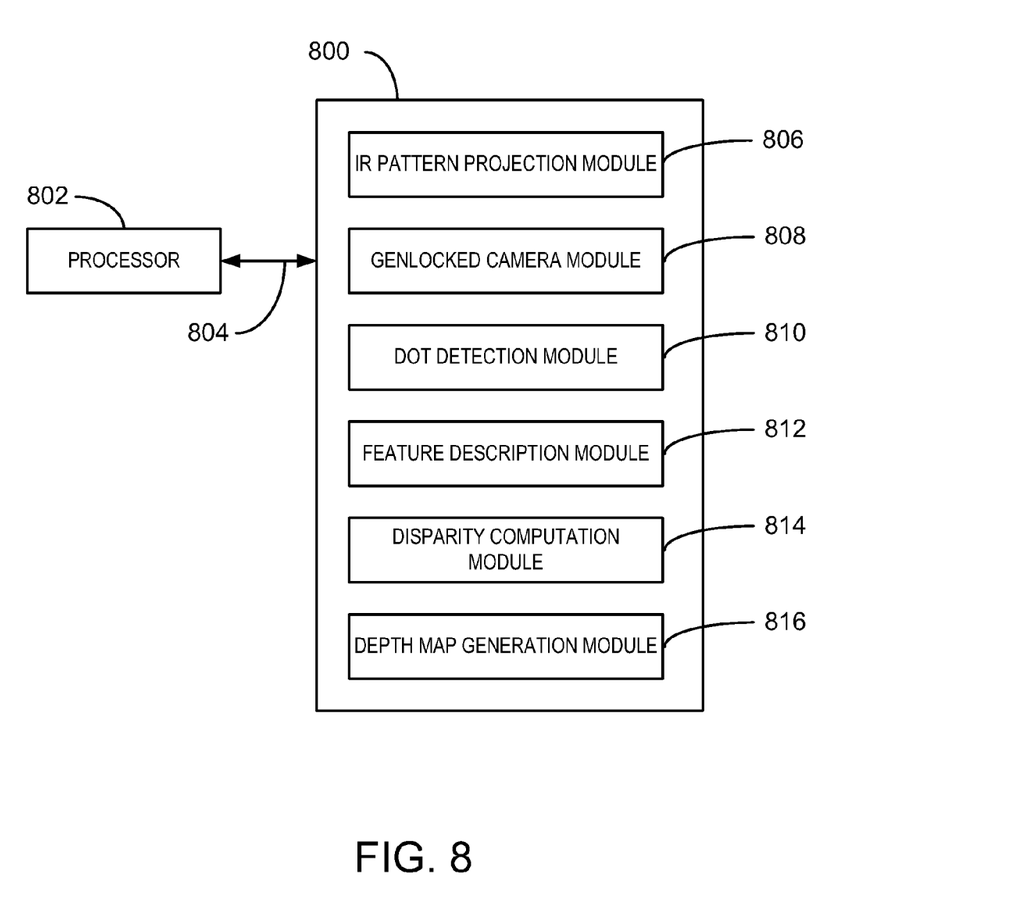
FIG. 8 is a block diagram showing a tangible, computer-readable medium that stores code adapted to generate a depth map for a scene.

FIG. 8 is a block diagram showing a tangible, computer-readable medium 800 that stores code adapted to generate a depth map for a scene. The tangible, computer-readable medium 800 may be accessed by a processor 802 over a computer bus 804. Furthermore, the tangible, computer-readable medium 800 may include code configured to direct the processor 802 to perform the steps of the current method.

The various software components discussed herein may be stored on the tangible, computer-readable medium 800 as indicated in FIG. 8. For example, a random IR dot pattern projection module 806 may be utilized to project a random IR dot pattern, or any other type of dot pattern, onto a scene. A genlocked camera module 808 may be used to genlock, or synchronize, two or more IR cameras, or any other type of camera that is capable of imaging random IR dot patterns. A dot detection module 810 may be used to detect dots within the stereo images from the genlocked cameras. A feature description module 812 may be utilized to identify feature descriptors for the dots in the stereo images, and a disparity map computation module 814 may use the results from the feature description module 812 to compute a disparity map between the stereo images. A depth map generation module 816 may be used to generate a depth map for the scene using the results from the disparity map computation module 814.

The current system and method may be used for a variety of applications. In an embodiment, the current system and method may be utilized to capture a new form of media, for example, free viewpoint media. In another embodiment, the current system and method may be utilized for teleconferencing purposes. For example, the use of multiple active IR stereo modules for teleconferencing may allow people in separate locations to effectively feel like they are physically together.

In yet another embodiment, the current system and method may be utilized for gaming applications. For example, the use of multiple active IR stereo modules may allow for accurate three-dimensional renderings of multiple people who are playing a game together from separate locations. The dynamic, real-time data captured by the active IR stereo modules may be used to create an experience, in which a person playing a game may be able to virtually see the three-dimensional images of the other people who are playing the game from separate locations. The possibility of using multiple active IR stereo modules to image a scene from different viewpoints may also allow for the accurate representation of full surface features for the scene.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed at least in part by a hardware processor, the method comprising:
projecting a random infrared dot pattern onto a scene;
genlocking a first infrared camera and a second infrared camera;
capturing a first infrared image of the random infrared dot pattern using the first infrared camera and a second infrared image of the random infrared dot pattern using the second infrared camera, wherein the genlocking causes the first infrared image to be temporally coherent with the second infrared image;
detecting a first plurality of first dots within the first infrared image captured using the first infrared camera;
detecting a second plurality of second dots within the second infrared image captured using the second infrared camera;
computing a first feature descriptor for an individual first dot in the first infrared image based on a corresponding first location of a neighboring first dot in the first infrared image that neighbors the individual first dot in the first infrared image;
computing a second feature descriptor for an individual second dot in the second infrared image based on a corresponding second location of a neighboring second dot in the second infrared image that neighbors the individual second dot in the second infrared image;
matching the individual first dot to the individual second dot based on similarity of the first feature descriptor to the second feature descriptor;
computing a disparity map reflecting pixel shifts across matched dots of the first infrared image and the second infrared image, the matched dots including the individual first dot and the individual second dot; and
generating a depth map for the scene using the disparity map.

2. The method of claim 1, wherein the first infrared camera and the second infrared camera are part of an active infrared stereo module, the method further comprising:
generating another depth map using another active infrared stereo module comprising other genlocked infrared cameras.

3. The method of claim 2, further comprising:
genlocking the active infrared stereo module and the another active infrared stereo module using a synchronization signal such that the first infrared camera and the second infrared camera are also genlocked with each of the other genlocked infrared cameras.

4. The method of claim 2, further comprising:
combining the depth map and the another depth map to create a constructive view of the scene.

5. The method of claim 2, the method further comprising:
projecting another random infrared dot pattern onto the scene with another infrared projector of the another active infrared stereo module.

6. The method of claim 5, wherein the random infrared dot pattern and the another random infrared dot pattern overlap.

7. The method of claim 1, further comprising:
capturing a color image of the scene with a color camera and supplementing the depth map with the color image.

8. The method of claim 1, further comprising:
assigning the individual first dot, the neighboring first dot, the individual second dot, and the neighboring second dot to specific coordinate locations of a grid; and
using the specific coordinate locations to determine the first feature descriptor and the second feature descriptor.

9. The method of claim 1, further comprising:
computing the first feature descriptor as a first radial descriptor based on a distance and reference angle between the individual first dot and the neighboring first dot; and
computing the second feature descriptor as a second radial descriptor based on a distance and reference angle between the individual second dot and the neighboring second dot.

10. A system comprising:
a hardware processor; and
a memory device storing instructions that configure the hardware processor to:
cause an infrared projector to project a random infrared feature pattern onto a scene, the random infrared feature pattern comprising a plurality of randomly-projected recognizable features;
obtain temporally-coherent infrared stereo images of the random infrared feature pattern, the temporally-coherent infrared stereo images being captured by a group of genlocked infrared cameras;
identify individual randomly-projected recognizable features within the temporally-coherent infrared stereo images captured by the group of genlocked infrared cameras;
compute a plurality of feature descriptors corresponding to the individual randomly-projected recognizable features in the temporally-coherent infrared stereo images captured by the group of genlocked infrared cameras;
use the plurality of feature descriptors of the individual randomly-projected recognizable features to compute a disparity map for the temporally-coherent infrared stereo images captured by the group of genlocked infrared cameras; and
generate a depth map for the scene using the disparity map.

11. The system of claim 10, further comprising:
a projector interface configured to connect the system to the infrared projector; and
a camera interface configured to connect the system to the group of genlocked infrared cameras.

12. The system of claim 11, further comprising the infrared projector connected to the projector interface and the group of genlocked infrared cameras connected to the camera interface.

13. The system of claim 10, wherein the instructions further configure the hardware processor to:
cause another infrared projector to project another infrared random infrared feature pattern onto the scene;
obtain another depth map using another group of genlocked infrared cameras; and
obtain a constructive view of the scene using the depth map and the another depth map.

14. The system of claim 10, wherein the individual randomly-projected recognizable features comprise dots, triangles, or grids.

15. The system of claim 10, wherein the instructions configure the hardware processor to:
compute the disparity map between the temporally-coherent infrared stereo images using differences between the plurality of feature descriptors.

16. The system of claim 10, wherein the instructions configure the hardware processor to:
in a first instance, project the individual randomly-projected recognizable features as dots;

in a second instance, project the individual randomly-projected recognizable features as triangles; and in a third instance, project the individual randomly-projected recognizable features as grids.

17. A method performed by a hardware processor of a computing system, the method comprising:

obtaining temporally-coherent infrared stereo images of a random infrared feature pattern projected onto a scene, wherein the temporally-coherent infrared stereo images were captured by a group of synchronized infrared cameras;

identifying individual randomly-projected recognizable features within the temporally-coherent infrared stereo images that were captured by the group of synchronized infrared cameras;

determining a plurality of feature descriptors corresponding to the individual randomly-projected recognizable features in the temporally-coherent infrared stereo images that were captured by the group of synchronized infrared cameras;

using the plurality of feature descriptors of the individual randomly-projected recognizable features to compute a disparity map for the temporally-coherent infrared stereo images that were captured by the group of synchronized infrared cameras; and generating a depth map for the scene using the disparity map.

18. The method of claim 17, further comprising:

determining at least some of the feature descriptors for certain randomly-projected recognizable features based on coordinates of neighboring randomly-projected recognizable features.

19. The method of claim 17, further comprising: causing the random infrared feature pattern to be projected onto the scene.

20. The method of claim 17, further comprising: generating a synchronization signal to synchronize the group of infrared cameras.

* * * * *